United States Patent [19]

Levy

[11] Patent Number: 5,082,691
[45] Date of Patent: Jan. 21, 1992

[54] SCRATCH REMOVAL FOR PLASTIC LENSES

[76] Inventor: Richard L. Levy, 74 Deer Creek Rd., Pittsford, N.Y. 14534

[21] Appl. No.: 573,796

[22] Filed: Aug. 28, 1990

[51] Int. Cl.$^5$ .............................................. B05D 35/00
[52] U.S. Cl. ................................... 427/140; 427/155; 427/164; 427/369; 427/384
[58] Field of Search ............... 427/140, 164, 369, 384, 427/155, 371

[56] References Cited

U.S. PATENT DOCUMENTS

| | | | |
|---|---|---|---|
| 369,431 | 9/1887 | Brown | 51/284 |
| 2,024,303 | 12/1933 | Obrig | 51/185 |
| 3,141,273 | 7/1964 | Sarofeen | 51/284 |
| 3,880,631 | 4/1975 | Ripley | 427/164 |
| 4,152,283 | 5/1979 | Cordrey et al. | 252/99 |
| 4,374,745 | 2/1983 | Sibley et al. | 427/140 |
| 4,410,563 | 10/1983 | Richter et al. | 427/164 |

*Primary Examiner*—Janyce Bell
*Attorney, Agent, or Firm*—Marjama & Pincelli

[57] ABSTRACT

A method of removing scratches and/or abrasions from the surface of a plastic lens which comprises providing a plastic lens which has one or more surface scratches and/or abrasions, applying a wax composition which contains a pigment to the surface of the lens resulting in the formation of a coating on at least the abraded and scratched portions of said surface and removing said wax coating by wiping it from said surface, whereby said surface is rendered substantially more tolerable to the user.

2 Claims, No Drawings

SCRATCH REMOVAL FOR PLASTIC LENSES

BACKGROUND OF THE INVENTION

This invention relates in general to plastic eye glass lenses and more specifically to a method of scratch reduction and increased tolerance to remaining scratches from the lens surface.

The advantages of plastic or synthetic resin lenses for eye glasses include durability and resistance to breaking along with less weight on the face of the patient, and therefore greater ease and comfort to the user. Plastic lenses, however, suffer from one major disadvantage in that they are more easily scratched then lenses made from conventional glass. In general severe scratches can only be removed by commercial polishing which requires that the user surrender his glasses to the optician for some extended period of time, and if the grinding or polishing is not too severe, the scratches can effectively be removed. This however puts the lenses in jeopardy by distorting the optics and not being very cost effective.

Various liquid commercial products available in the marketplace have not been found to be suitable for removing scratches from plastic lenses.

There has, therefore, been a longstanding need for a simple method of repairing and/or removing scratches from plastic lenses, which would restore the surface of the lens to a lessened scratch condition, resulting in both improved vision to the user, and also extending the effective life of the lens.

It is therefore an object of the present invention to provide a simple and inexpensive method of scratch-removal for plastic eye glass lenses.

SUMMARY OF THE INVENTION

The present invention involves coating the scratched or abraded surface of a plastic lens by contacting the defected area with a wax composition which contains a pigment, to entirely cover the surface with a wax coating. The wax is then substantially immediately removed by wiping with a cloth or paper towel resulting in the removal or buffing out of the fine scratches. The wax in the form of a pencil may be applied by rubbing directly on the lens surface. Those deeper scratches are reduced and filled in with a black pigment allowing the scratch to be less obvious.

DETAILED DESCRIPTION OF THE INVENTION

The wax composition suitable for use in the present invention may comprise any wax or a mix of waxes which contain a suitable pigmenting agent. For example, a mix of free fatty acids, paraffinic hydrocarbons, and triglycerides comprise a suitable mixture which may be used in the present invention. A typical pigment suitable for use in the present invention comprises carbon black. A suitable ratio of these for this wax composition would comprise about 40% wax and 60% pigment by weight.

A suitable formulation for the wax composition is as follows:

| | | |
|---|---|---|
| Free Fatty Acids | C-14 (Myristic) = | 4.59% |
| | C-16 (Palmitic) = | 9.43% |
| Paraffinic Hydrocarbons | C-22 = | 0.45% |
| | C-23 = | 1.36% |
| | C-24 = | 3.76% |
| | C-25 = | 3.98% |
| | C-26 = | 4.60% |
| | C-27 = | 4.74% |
| | C-28 = | 5.02% |
| | C-29 = | 5.62% |
| | C-30 = | 4.97% |
| | C-31 = | 4.75% |
| | C-32 = | 3.77% |
| | C-33 = | 2.73% |
| | C-34 = | 1.86% |
| | C-35 = | 1.64% |
| | C-36 = | 1.20% |
| | C-37 = | 1.34% |
| | C-38 = | 1.07% |
| | C-39 = | 1.03% |
| | C-40 = | 0.86% |
| | C-41 = | 0.63% |
| | C-42 = | 0.35% |
| Triglycerides | C-47 = | 0.35% |
| | C-49 = | 2.27% |
| | C-51 = | 5.27% |
| | C-53 = | 11.36% |
| | C-55 = | 8.65% |

A commercially available composition suitable for use in the present invention comprises a black wax marking pencil sold by Berol USA, a division of Berol Corporation of Brentwood, Tenn., under the trademark CHINA MARKER.

Typical plastic lenses upon which the present invention can be used include Polycarbonate lenses available from Gentex Optics, Inc., of Dudley, Mass. and Hard Resin plastic lenses (CR-39) available from Silor Optical, of Glen Head, N.Y.

One suitable technique in carrying out the present invention is to apply the wax to both sides of lenses, covering the entire surface, wiping off the wax with a paper towel, and then rubbing between the fingers as to give a buffing effect. The process may be repeated if necessary.

The rubbing action to remove the pigmented wax in conjunction with the wax itself actually involves a cutting action which removes fine surface scratches and lightens deeper ones. Those deeper scratches that are not completely removed are filled in with a black pigment which actually keeps light from deflecting off the scratches and therefore makes it more tolerable to the user. Commercially available liquid scratch removal products which only work on very fine hairline scratches do not appear to have as much of a cutting action.

Although the exact mechanism of scratch removal for the present invention described above is not fully understood, it is believed that certain light scratches and abrasions are removed by the buffing out or polishing of the surface of the plastic lenses. Deep or more prominent scratches which appear to be removed or disappear after treatment, may well be filled by the wax composition, and present a lightened scratch with a slight black pigment within the scratch itself. In any case, after application of the method of the present invention, plastic lenses which were previously scratched and/or abraded appear to be free of defects or have reduced scratches in a more tolerable state and vision for the user is markedly improved. In some cases where the scratches and/or defects are rather severe, repeated treatment by the method of the present invention is required at regular intervals.

While the invention has been described in detail and with respect to specific embodiments thereof, it will be apparent to one skilled in the art that changes and modifications can be made therein without departing from the spirit and scope thereof.

We claim:

1. A method of removing scratches and abrasions from the surface of a plastic lens which comprises:
   (a) providing a plastic lens which has one or more surface scratches or abrasions;
   (b) applying a wax composition which contains a carbon black pigment to the surface of the lens resulting in the formation of a coating on at least the abraded and scratched portions of said surface; and
   (c) removing said wax coating, except for the wax which remains in the scratches or abrasions by wiping it from said surface, whereby said surface is rendered substantially more tolerable to the user.

2. The method of claim 1 in which the composition comprises wax in the concentration of about 40% by weight with the balance comprising carbon black pigment.